United States Patent
Böger et al.

(10) Patent No.: US 8,470,111 B2
(45) Date of Patent: Jun. 25, 2013

(54) METHOD FOR PRODUCTION OF THIN SHEET METAL

(75) Inventors: Thorsten Böger, Duisburg (DE); Peter Klauke, Schwerte (DE); Oliver Kleinschmidt, Dortmund (DE); Christoph Filthaut, Dortmund (DE); Ingo Rogner, Ingolstadt (DE); Oliver Thöle, Schwerte (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 97 days.

(21) Appl. No.: 12/679,424

(22) PCT Filed: Sep. 24, 2008

(86) PCT No.: PCT/EP2008/062783
§ 371 (c)(1),
(2), (4) Date: May 13, 2010

(87) PCT Pub. No.: WO2009/043777
PCT Pub. Date: Apr. 9, 2009

(65) Prior Publication Data
US 2010/0233505 A1    Sep. 16, 2010

(30) Foreign Application Priority Data
Sep. 26, 2007  (DE) .................. 10 2007 046 226

(51) Int. Cl.
*B29C 44/24*    (2006.01)
*B29C 65/18*    (2006.01)

(52) U.S. Cl.
USPC .......... 156/78; 156/311; 428/319.1; 428/458; 428/613; 428/626

(58) Field of Classification Search
USPC ................. 156/78, 311; 428/319.1, 458, 461, 428/613, 626
See application file for complete search history.

(56) References Cited

U.S. PATENT DOCUMENTS

| 3,407,151 A | * | 10/1968 | Overcashier et al. | ........... | 521/79 |
| 3,810,965 A | * | 5/1974 | Sen et al. | .................. | 264/53 |
| 4,078,959 A | * | 3/1978 | Palfey et al. | .................. | 156/214 |

(Continued)

FOREIGN PATENT DOCUMENTS

| DE | 40 19 202 | 12/1991 |
| DE | 197 24 361 A1 | 1/1998 |

(Continued)

OTHER PUBLICATIONS

International Search Report for International Application No. PCT/EP2008/062783.

*Primary Examiner* — Michael Tolin
(74) *Attorney, Agent, or Firm* — Reinhart Boerner Van Deuren P.C.

(57) ABSTRACT

A composite component comprising at least one first and one second sheet metal plate with at least one layer of a polymer arranged between the first and the second sheet metal plates provides for a component optimized with respect to the weight thereof, and which is at the same time simple to manufacture. The polymer layer of the composite component according to the invention comprises at least one foamed polymer layer of a thermoplastic polymer, wherein the foamed polymer layer comprises gas bubbles with a volume percentage of 1% to 80%, in particular 5% to 70%.

8 Claims, 2 Drawing Sheets

U.S. PATENT DOCUMENTS

| | | | |
|---|---|---|---|
| 5,403,424 A * | 4/1995 | Ehrat et al. | 156/247 |
| 7,063,768 B2 * | 6/2006 | Tsujimoto et al. | 156/308.2 |
| 2001/0011832 A1 * | 8/2001 | Ehrlich et al. | 296/181 |
| 2006/0269701 A1 * | 11/2006 | Gauriat et al. | 428/31 |
| 2007/0166526 A1 | 7/2007 | Myard et al. | |

FOREIGN PATENT DOCUMENTS

| | | |
|---|---|---|
| DE | 10 240 384 | 3/2004 |
| DE | 10 2004 022 677 | 5/2004 |
| EP | 0 356 837 | 3/1990 |
| EP | 1 044 796 A | 10/2000 |
| EP | 1 504 892 | 2/2005 |
| EP | 1044796 B1 * | 1/2006 |
| GB | 2 332 875 | 7/1999 |
| WO | 03/037970 | 5/2003 |

* cited by examiner

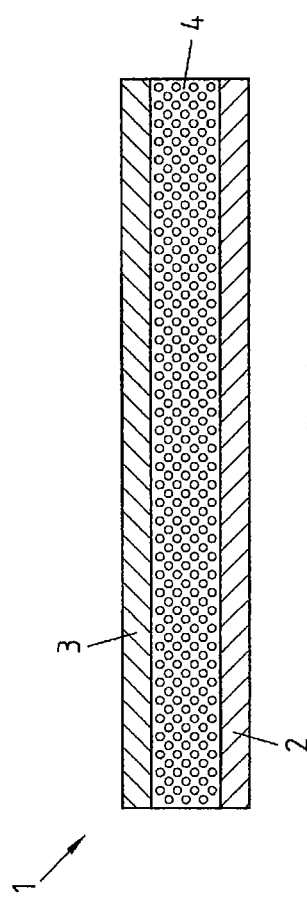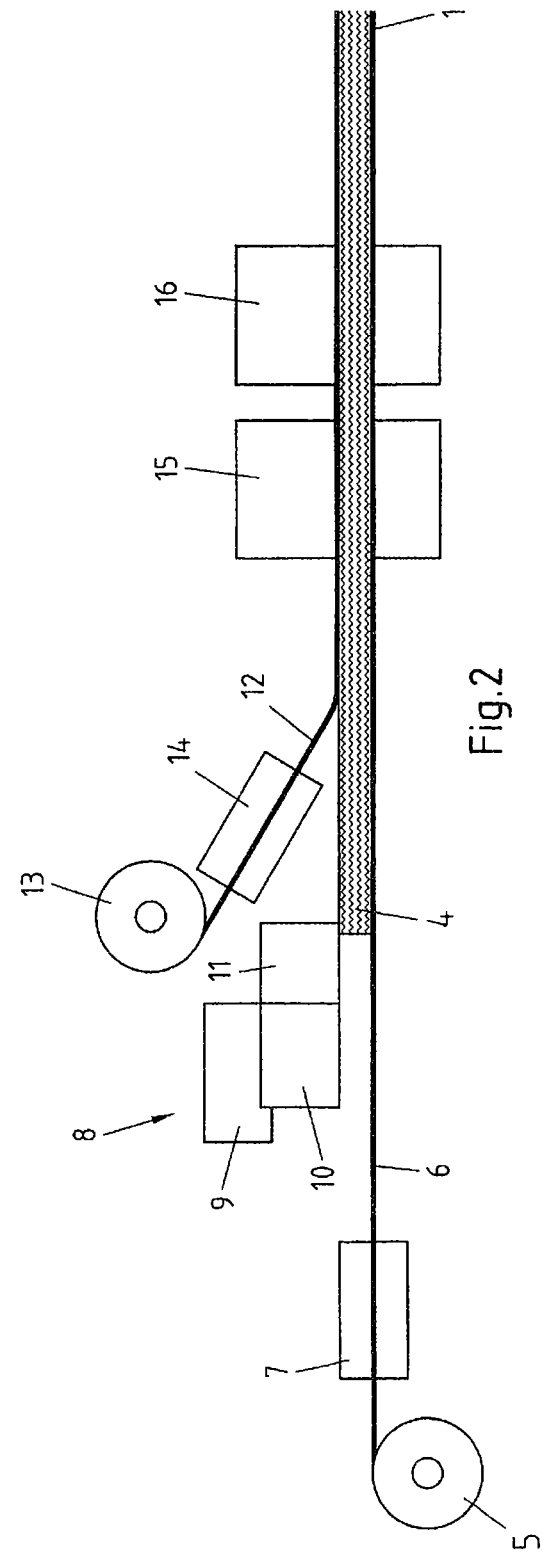

METHOD FOR PRODUCTION OF THIN SHEET METAL

CROSS-REFERENCE TO RELATED APPLICATIONS

This application is a National Phase Application of International Application No. PCT/EP2008/062783, filed on Sep. 24, 2008, which claims the benefit of and priority to German patent application no. DE 10 2007 046 226.5-16, filed on Sep. 26, 2007. The disclosures of the above applications are incorporated herein by reference in their entirety.

FIELD OF THE INVENTION

The invention relates to a composite component comprising at least one first and one second sheet metal plate with at least one layer of a polymer arranged between the first and the second sheet metal plate, and also a method for the production of a corresponding composite component, and also the use thereof

BACKGROUND

In the automobile industry, lightweight components, which apart from a low weight must also have high strength and rigidity, are used to a considerable degree. Frequently, corresponding lightweight components, for example in the case of a vehicle body, also serve as outer skin panels so that their surfaces must also meet correspondingly high standards. One approach for achieving this aim is to combine different materials. Thus, for example, German patent application DE 10 2004 022 677 A1 discloses composite components which, as a sandwich structure, consist of two outer sheet metal plates and one inner polymer layer, the polymer layer being designed as foam material. However, in order to bond the metal parts to the polymer layer, an adhesive or adhesion promoter must be carefully applied. In addition, a double conveyer is disclosed, which is intended to limit the thickness of the reactive foam layer and to assist the reactive foaming process by heatable sections.

Furthermore, the published European Patent Application EP 1 504 892 A1 discloses the provision of a polymer layer consisting of a polyamide or a polyamide-polyethylene blend between two sheet metal plates. This composite component is, however, capable of improvement with respect to its weight.

SUMMARY OF THE INVENTION

On this basis, an aspect of the present invention is to propose a composite component optimized regarding the weight thereof, which is at the same time simple to produce.

The aspect indicated above is achieved in a first teaching of the present invention for a generic composite component in that the polymer layer has at least one foamed polymer layer of a thermoplastic polymer, wherein the foamed polymer layer comprises gas bubbles with a volume percentage of 1% to 80%, in particular 5% to 70%.

It has been shown that the use of a foamed polymer layer can contribute considerably to reducing the weight of a composite component with the same strength and rigidity. By introducing or forming gas bubbles in the foamed polymer layer, the weight of the composite components and the consumption of polymers can be reduced during the production of the foam layer by corresponding volume percentage substitution, as a result of which the manufacturing costs can also be minimized. Furthermore, by using thermoplastic polymers the utilization of an adhesive as adhesion promoter can be dispensed with, since bonding to the metal component can be achieved by heating and cooling the thermoplastic polymer.

In a first embodiment of the composite component according to the invention, the foamed polymer layer consists of a temperature-resistant, thermoplastic polymer. Temperature-resistant, thermoplastic polymers in the sense of the present invention are for example polymers which do not exhibit a loss of shape during heating to 210° C. for a short time and during heating to 190° C. for at least 20 minutes. The composite component is therefore able to safely withstand in particular subsequent priming stages with ensuing hardening of the priming layer.

If the foamed polymer layer contains a polyamide or polyamide-blend, the material costs for the foamed polymer layer can be kept to a minimum. Furthermore, polyamide and also a corresponding polyamide-blend are temperature-resistant. A preferred polymer blend for example is a polyamide-polyethylene blend, in particular a PA6 polyamide with a proportion of grafted polyethylene and a reactive copolymer.

In a next exemplary embodiment of the composite component according to the invention, the layer thickness of the polymer layer is between 50 μm and 5000 μm, preferably between 200 μm and 1000 μm. With the layer thicknesses mentioned, on the one hand the necessary strength and rigidity of the composite are ensured. On the other hand adequate weight reduction is achieved in relation to solid material.

In a next refined embodiment of the composite component according to the invention, the thickness of the sheet metal plates that are used is between 0.15 and 3.0 mm. Preferably a sheet metal plate thickness of 0.2 to 0.5 mm, in particular 0.2 to 0.4 mm is used, since in this range optimum deformation properties of the composite component according to the invention are ensured, for example with respect to utilization as the outer skin panel of a vehicle body.

In order to adapt the composite component optimally to a specific application, the sheet metal thicknesses of the first and second sheet metal plates can be different.

Likewise, depending on application, the sheet metal plates can consist of a steel alloy also of stainless steel, aluminum, magnesium and/or titanium alloys. Other metals which can be processed into sheet metal plates can also be used for the composite component according to the invention. In particular a combination of different metal alloys or metals can also be used.

In order to optimize the properties of a composite component according to the invention, at least one sheet metal plate is coated on one or both sides. The coatings can, for example, be metallic or also organic. For this purpose, the most varied methods to apply the metallic coatings are available, for example electrolytic deposition, hot-dipping, roll-cladding or also physical vapor deposition or chemical vapor deposition.

It is advantageous if a sheet metal plate is pre-treated with adhesive primer or another pre-treatment. The adhesive properties of the foamed polymer layer are improved by means of the adhesive primer. For this, the coatings can be applied onto the sheet metal plate in a coil coating process, for example. Other application methods are naturally equally available for applying organic coatings. The coating of the composite component, for improving the adhesion of the composite, is usually applied on the interface to the foamed polymer layer. Other functions, for example decorative purposes, corrosion protection purposes or else coatings permitting oil-free shaping of the composite component are also possible. Temporary corrosion protection can be achieved for example by oiling the sheet metal plates. However, the oil is normally thoroughly removed before the composite component is produced.

The composite component according to the invention can be used directly in automobile construction, if after its production this has been shaped in a downstream forming process to a blank or to the finished shape.

In a second teaching of the present invention, the aspect indicated above for a method according to the invention for the production of a composite component is achieved in that a first metal strip is unwound from a first coil and a second metal strip is unwound from a second coil,

- a thermoplastic foamed polymer layer is applied onto at least one metal strip;
- the foamed polymer layer is produced by physically introducing gas bubbles into the polymer melt, so that the foamed polymer layer comprises gas bubbles with a volume percentage of 1% to 80%, preferably 5% to 70%;
- the first metal strip, the thermoplastic foamed polymer layer and the second metal strip are bonded to one another through the effect of temperature and exertion of pressure and
- the linear composite component that is produced is wound onto a coil or cut into sheet-like composite components.

As already stated, it has been shown that the use of a thermoplastic foamed polymer layer comprising gas bubbles with a volume percentage of 1% to 80%, preferably 5% to 70% leads to considerable reduction in the weight of a composite component consisting of two sheet metal plates and one intermediate polymer layer and at the same time no longer requires the use of adhesive as adhesion promoter. This simplifies production of the composite component considerably and leads to lighter composite components. If the foamed polymer layer is also produced by physically introducing into the polymer melt gas bubbles with a volume percentage of 1% to 80%, in particular 5% to 70%, the density of the polymer foam that is produced can be directly influenced. The gas used for foaming can for example be air, carbon dioxide, nitrogen or another arbitrary gas or possibly also a combination of gases.

The method for the production of the composite component according to the invention is simplified by the fact that, in a next embodiment, the foamed polymer layer is applied onto the first metal strip as pre-extruded foil or the foamed polymer layer is extruded directly onto the first metal strip. The pre-extruded foil can be simply made available for linear processing of the metal strip by means of a further coil and can be bonded accordingly to the metal strips by applying pressure and heat. A further simplification of the method is achieved if the foamed polymer layer is extruded directly onto the first metal strip, advantage being taken of the fact that the foamed polymer layer, when it is extruded, is directly available in a condition having adhesive properties.

In a next embodiment of the method according to the invention, the first metal strip is heated before the foamed polymer layer is applied and/or the second metal strip is heated before being applied onto the foamed polymer layer. Heating results in the fact that the thermoplastic foamed polymer layer, on its interface with the metal, remains in a soft condition and to this extent promotes good adhesion with the sheet metal plate. Due to the insulating effect of the gas bubbles, temperatures can be kept lower and a wide temperature window for the bonding process is made possible.

Furthermore, it is advantageous to bond the first metal strip, the foamed polymer layer and the second metal strip to one another by using a double band press, wherein regulated control of temperature and pressure and also distance regulation take place inside the double band press. In contrast to the counter-rotating rollers that are normally used, specific influence can be exerted on the adhesion of the foamed polymer layer to the metal strips by means of the double band press via the temperature control and also via the pressure control, and in this respect an improved linear composite component can be made available. In particular more uniform foamed polymer layer thicknesses that can be precisely adjusted especially over the entire width may be obtained with this method so that the composite components manufactured in this way are very suitable for use as outer skin panels with optimum surface properties.

In an advantageous embodiment, the double band press has at least one heating zone and a cooling zone and also optionally a pressure zone. The heating zone and the cooling zone ensure a controlled bonding process within the area of the double press. For the heating zone and the cooling zone, preferably in each case a separate continuous belt is provided for conveying the linear composite component in order to further improve temperature control. The pressure zone that is optionally provided can be used for calibration and can be implemented by a pair of rollers, for example. Higher pressures can be adjusted very precisely by means of a pair of rollers, in order to obtain improved uniformity of the thickness of the linear composite component. As a result, the linear composite component also has an improved surface.

For optimum control of temperature, the second metal strip is preferably heated before bonding with the foamed polymer layer and the first metal strip, so that the second metal strip does not have to be fully heated in the downstream application of pressure.

Improved stability of the bubble formation during the foaming operation of the foamed polymer layer is achieved in a next embodiment in that at least one polar gas or a gas mixture containing at least one polar gas is used for the foaming operation.

If, in a further advantageous embodiment of the method according to the invention, laminating strips, whose outer surface lying on the linear composite component is coated and optionally surface-treated, are used in the double band press, the outer surfaces of the linear composite component can be protected from negative production influences and production faults. For example, laminating strips that are sanded and coated with silicone can achieve very good results with respect to the surface quality of the linear composite component.

Finally, the method according to the invention can be configured further advantageously in that the linear composite component is converted before and/or after separation into sheet-like composite components. This results in a particularly economic method for producing the composite component according to the invention.

In a third teaching of the present invention, the composite component according to the invention is used advantageously in automobile, aircraft, ship, submarine, rail-mounted vehicle construction, space or construction industries. Advantages arise namely as a result of the composite component according to the invention whenever lightweight construction concepts demand weight reduction.

BRIEF DESCRIPTION OF THE DRAWINGS

There are a plurality of possible embodiments of the composite component according to the invention, the production methods according to the invention and use thereof. In this connection, reference is made for illustration purposes to the description of two exemplary embodiments in conjunction with the drawing. The drawing shows in:

FIG. 1 a first exemplary embodiment of a composite component according to the invention in a schematic cutaway view;

FIG. 2 a schematic illustration of a device for executing a first exemplary embodiment of the method according to the invention for the production of a composite component.

DETAILED DESCRIPTION

Figure 3:
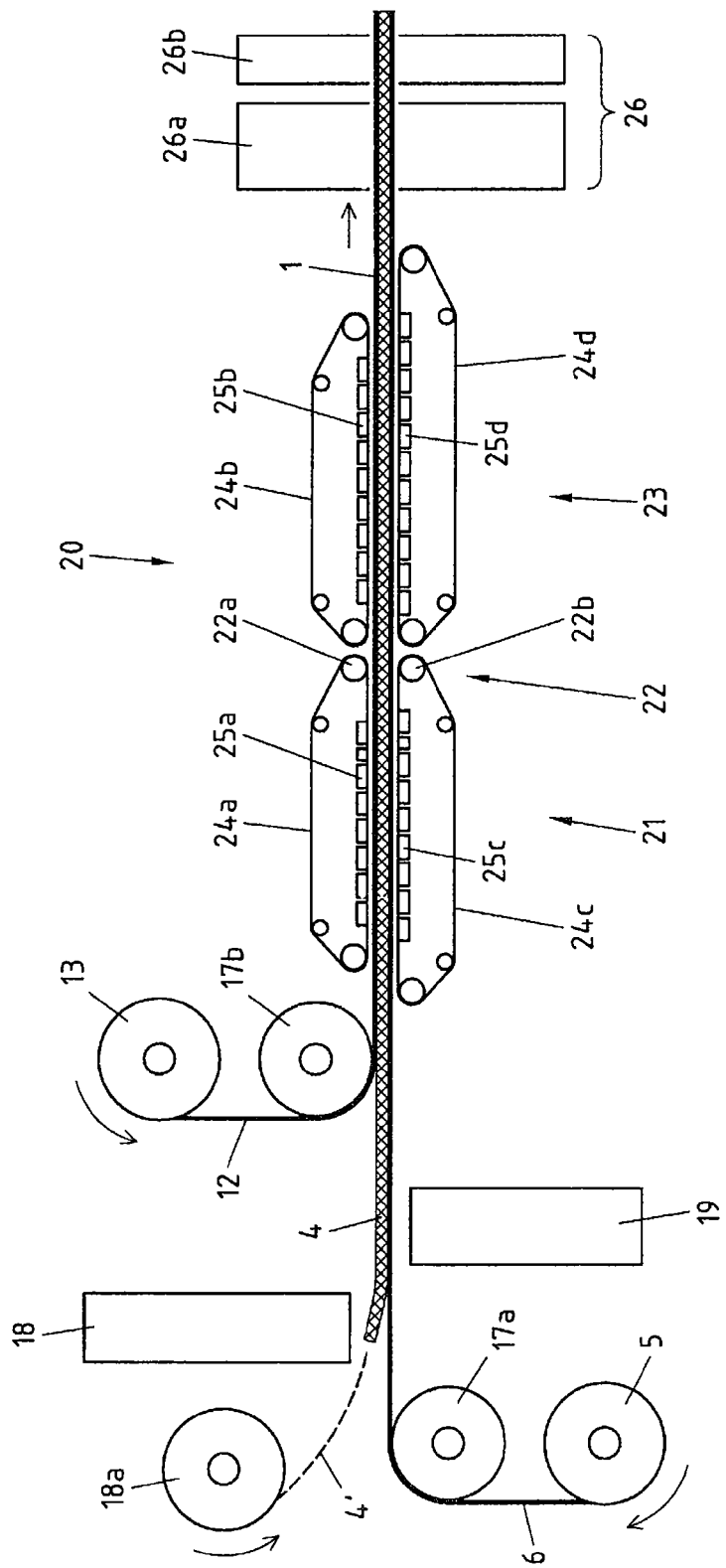
FIG. 3 a schematic illustration of a device for executing a second exemplary embodiment.

The composite component 1 illustrated in FIG. 1 consists of a first sheet metal plate 2, a second sheet metal plate 3 and also a foamed polymer layer 4 arranged between both sheet metal plates. The foamed polymer layer 4 in the present exemplary embodiment of the composite component 1 according to the invention consists of a temperature-resistant polymer foam from a polyamide-polyethylene blend containing air bubbles with a volume percentage of 40%. The mass of the polymer between the sheet metal plates is substantially reduced by using a polymer foam without impairing its physical properties. Due to this weight saving, the composite components 1 according to the invention can be used particularly satisfactorily for lightweight construction concepts in the automobile, aircraft or rail-mounted vehicle construction industries. However, further areas of application in lightweight construction—not mentioned here—are possible due to the properties of the composite components.

In FIG. 2 a device for the production of an exemplary embodiment of a composite component 1 according to the invention is now schematically illustrated. A first metal strip 6, which is pre-heated in a heating zone 7, is made available by means of a first coil 5. The metal strip 6 can consist of the most varied metals or alloys, for example, steel, aluminum, titanium etc. In the case of steel alloys, the metal strip preferably has a thickness of 0.15 to 0.8 mm, so that it can be used particularly satisfactorily as outer skin in the construction of vehicle bodies. When using other metals for the production of the composite component, other thicknesses of the sheet metal plates can also be used.

In the exemplary embodiment illustrated of the method according to the invention, the foamed polymer layer is extruded from an extruder 8 directly onto the first metal strip 6, wherein the extruder 8 is made up of three units, for example. The first unit 9 melts the polymer granulate, whereas the second unit 10 preferably physically introduces gas bubbles, for example air bubbles, into the polymer melt in order to produce the polymer foam. Finally the polymer melt that is aerated with gas bubbles is extruded by means of an extrusion nozzle 11 onto the metal strip 6 and there forms a foamed polymer layer 4. The second metal strip 12 is made available by unwinding a coil 13 and is heated in a heating section 14 before contact with the foamed polymer layer 4. The heating section 14, just as the heating zone 7, is adapted to the metal that is to be heated. For example, inductive heating of the metal strip is suitable when using a steel alloy. However, other methods can also be used for heating the metal strip.

Contact between the second metal strip 12 and the foamed polymer layer 4 is preferably first made inside the double band press 15 so that, through defined heating in a, for example, segmented heating zone 15a at temperatures between 210 and 270° C., the foamed polymer layer 4 aerated with air bubbles is bonded between the metal strips 6, 12. The double band press can apply positive pressure of up to 30 bar within the area of the heating zones 15a. The pressure that is built up is sufficient to even out the heat transmission and to melt on the foamed polymer layer 4 satisfactorily.

In a further stage, in a pressure zone 15b, for example by means of—not illustrated—pressure rollers, a high line pressure of up to 20 bar can be exerted on the linear composite component 1, as a result of which the adhesion between sheet metal plate 6, 11 and foamed polymer layer may be improved. In a third stage, the linear composite component 1 is then specifically cooled down in a segmented cooling zone 15b, so as to calibrate the total composite thickness. If necessary, an additional cooling unit 16 can be arranged on the outlet side of the two-stage double band press, so that the temperature in the linear composite component 1 can be reduced further, for example by means of spraying.

Subsequently, the linear composite component 1 can undergo separation or shaping in order to produce a finished composite component or a semi-finished product. Corresponding devices are not illustrated in FIG. 2.

Finally, FIG. 3 in a schematic view shows a device for executing a second exemplary embodiment of the method according to the invention, wherein a first metal strip 6 is heated by means of a heating roller 17a. The temperature of the heating roller 17 can reach 240° C., for example. The extruder 18 directly extrudes a foamed polymer layer 4 onto the first metal strip 6, wherein inside the extruder gas is physically introduced under pressure into the plastic melt, which gas expands when the pressure is released at the outlet of the extruder 18 and forms fine gas bubbles. The gas bubbles can have a volume percentage of 1 to 80%, preferably 5 to 70%. With the gas bubbles having a volume percentage of 40%, likewise very good results were obtained. Alternatively, however, the foamed polymer layer can also be applied as foil 4' by means of a coil 18a, which is indicated in FIG. 3.

High process stability during gas bubble formation resulted by using a polyamide-polyethylene blend in conjunction with a mixture of a polar gas, for example oxygen and a non-polar gas, for example nitrogen. Good results were therefore also obtained by using air to form the bubbles.

Before being fed into the double band press 20, edge strip re-granulation is carried out using a device 19, which removes and reprocesses residues of the foamed polymer layer, and for example crushes them up again so they can be returned to the production process.

The second metal strip 12 is then unwound by means of a coil 13 and applied by means of a heating roller 17b onto the foamed polymer layer 4. Due to the high temperature of the second metal strip, bonding between the second metal strip and the foamed polymer layer 4 can take place by melting on of the foamed polymer layer 4. For this purpose, the first metal strip 6 with the foamed polymer layer 4 arranged thereon and the second metal strip 12 are fed into the double band press 20.

The double band press 20 has three sections, a heating zone 21, a pressure zone 22 and a cooling zone 23, the cooling zone 23 and the heating zone 21 each comprising separated laminating strips 24a, 24b, 24c, 24d. Preferably, the laminating strips have coated and processed surfaces. With the present exemplary embodiment, in the case of a low pressure of approximately 0.2 to 0.5 bar, a temperature of approximately 230° C. is adjusted in the heating zone 21 by means of a temperature-adjusting medium flowing through the plates 25a and 25c. In addition, the temperature-adjusting medium can also have higher temperatures, for example 260° C.

Laminating rollers 22a and 22b, which form the pressure zone 22 in the present exemplary embodiment, exert a pressure, which for example can lie in the range of approximately 12 bar, on the linear composite component 1 after it has run through the heating zone 21. Irregularities, for example in the thickness of the linear composite component, are evened out as a result. However, it is also conceivable that higher pressures can be exerted on the composite component by the laminating rollers. For example, the pressure can reach up to 50 or 100 kN.

Preferably, the gap which is formed by the laminating strips 24a and 24c in the heating zone 21 runs together in a wedge-shape, so that the foamed polymer layer 4 is compressed. In order to improve uniformity, the plates 25a and 25c and also 25b and 25d are arranged offset by half a plate against one another.

In the cooling zone 23, the linear composite component 1 is cooled down to a temperature of less than 180° C. By means of the plates 25b and 25d, a pressure of approximately 0.2 to 0.5 bar continues to be exerted on the composite component 1. Due to the low pressures, edge sealing, as was usual up to now whenever high pressures were used, is no longer necessary and as a result the production method is considerably simplified.

For this purpose, a cooling agent flows through the plates 25b and 25d. For example, a cooling agent at a temperature of 20° C. can flow through the plates 25b and 25d in order to achieve considerable cooling of the composite component. Afterwards the linear composite component 1 passes through at least one cooling device 26. Cooling takes place by water-spraying 26a and subsequent squeeze-rolling 26b to remove the water.

The invention claimed is:

1. Method for the production of a composite component comprising at least one first and at least one second sheet metal plate with at least one layer of a polymer arranged between the at least one first and the at least one second sheet metal plate, the method comprising:
   unwinding a first metal strip from a first coil and unwinding a second metal strip from a second coil,
   applying a thermoplastic foamed polymer layer comprising a PA6 polyamide with a proportion of grafted polyethylene and a reactive copolymer onto at least one of the first or second metal strips,
   producing the foamed polymer layer by physically introducing gas bubbles into a polymer melt, so that the foamed polymer layer comprises gas bubbles with a volume percentage of 1% to 80%,
   binding the first metal strip, the thermoplastic foamed polymer layer and the second metal strip to one another through temperature and exertion of pressure and
   winding a linear composite component that is produced onto a coil or cutting the linear composite component into sheet composite components.

2. Method according to claim 1, wherein the foamed polymer layer is applied onto the first metal strip as pre-extruded foil or the foamed polymer layer is extruded directly onto the first metal strip.

3. Method according to claim 1, wherein the first metal strip is heated before the foamed polymer layer is applied and/or the second metal strip is heated before being applied onto the foamed polymer layer.

4. Method according to claim 1, wherein the first metal strip, the foamed polymer layer and the second metal strip are bonded to one another by using a double band press, wherein regulated control of temperature and pressure and also distance regulation take place inside the double band press.

5. Method according to claim 4, wherein the double band press comprises at least one heating zone and a cooling zone and also optionally a pressure zone.

6. Method according to claim 4, wherein laminating belts, whose outer surface lying on the linear composite component is coated and optionally surface-treated, are used in the double band press.

7. Method according to claim 1, wherein at least one polar gas or a gas mixture containing at least one polar gas is used for the foaming operation.

8. Method according to claim 1, wherein the linear composite component is shaped before and/or after separation into sheet composite components.

* * * * *